SYNCHRONIZING ARRANGEMENT UTILIZING AN ELECTROMECHANICAL RESONATOR TO DERIVE CLOCK PULSES FROM A BINARY DATA SIGNAL

Filed June 24, 1964 2 Sheets-Sheet 1

INVENTOR.
WILLIAM W. MAC GREGOR
BY
Russell, Chittick & Pfund

INVENTOR.
WILLIAM W. MAC GREGOR
BY
Russell, Chittick & Pfund 3,368,037

SYNCHRONIZING ARRANGEMENT UTILIZING AN ELECTROMECHANICAL RESONATOR TO DERIVE CLOCK PULSES FROM A BINARY DATA SIGNAL

William W. MacGregor, Wellesley Hills, Mass., assignor to Honeywell Inc., Minneapolis, Minn., a corporation of Delaware Filed June 24, 1964, Ser. No. 377,620
5 Claims. (Cl. 178—69.5)

Figure 1:
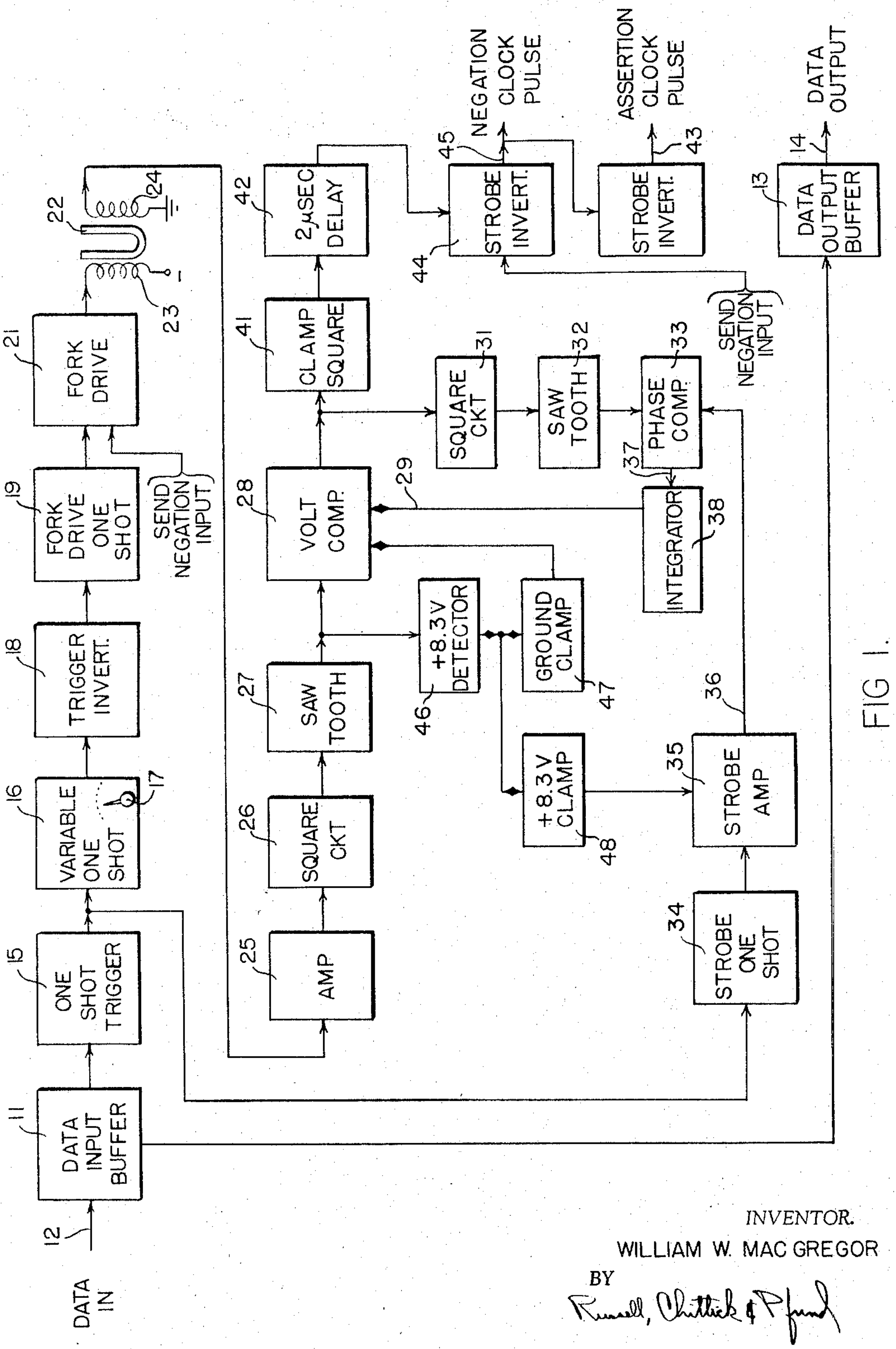

This invention relates generally to synchronizing arrangements for binary signal receiving installations and more particularly to improved method ad apparatus for developing a synchronizing signal for decoding received binary signals.

The transmission of information in the form of binary signals over existing communication links has become increasingly more important, primarily due to the ability of electronic data processing installations to be interconnected with remote points where data is generated or utilized by connecting the data processer with the remote point over an ordinary existing telephone or telegraph line. In such arrangements, it is customary to employ self-synchronization, i.e., deriving the synchronization requisite at a receiver from the same signals that carry the message information and not to provide a separate synchronizing signal. Examples of synchronizing arrangements of this type are shown in U.S. Patents 2,957,045 and 3,010,073.

Arrangements for deriving a synchronizing signal from a binary data signal such as known in the prior art have provided for phase adjustments of the generated clock pulse, and in other cases, the generation of the clock pulse is under the control of a local oscillator, the frequency of which can be varied as well as the actual phase of the clock-pulse output. Arrangements which provide only a phase adjustment have suffered from the fact that a precise frequency identity for the various remote stations and the central data processer cannot be achieved by any known frequency control means in the frequency range of interest. On the other hand, locally generated waves originating at a local oscillator where both frequency control of the oscillator and phase control of the output clock pulse are attempted have suffered from disadvantages due to the ambiguities involved in the phase of the oscillator at start-up and the resultant inability of the phase correction networks to bring the oscillator into synchronism with the incoming data.

It is accordingly the primary object of the present invention to provide an improved method for developing a synchronized clock-pulse for incoming binary data signals, and apparatus for accomplishing this end which utilizes a resonator that is tuned closely to the expected frequency of the binary data signal. The tuned resonator is employed as a filter and, hence, the frequency-phase characteristic of such a resonator is available for a continuous frequency correction which is unambiguous with respect to the incoming data signal and hence does not involve problems with respect to relative phase present at start-up in the manner previously described with respect to local oscillator systems.

In order to accommodate the wide range of jitter to which signals over narrow-band communication links are subject, the arrangements of the present invention provide for a phase control feed-back loop responsive to the actual occurrence times of the data transitions to adjust the phase of the generated clock pulse midway between the transitions. A wide range of phase control is provided sufficient to accommodate the extreme jitter characteristics of the equipment employed in the communication link with this phase range of adjustment accomplished relative to the phase-frequency characteristic of the resonator which introduces a fixed phase correction per cycle to accommodate the system to the slight variations in frequency between the transmitter and receiver stations and the frequency control elements located thereat. Thus the clock pulse generated in response to an incoming binary data signal is reliably produced under all conditions of operation with the phase position of the clock pulse located at the middle of the bit interval and hence at the most probable time for clocking the data and obtaining a correct bit read-out of a ZERO or ONE in accordance with the message content.

Figure 2:
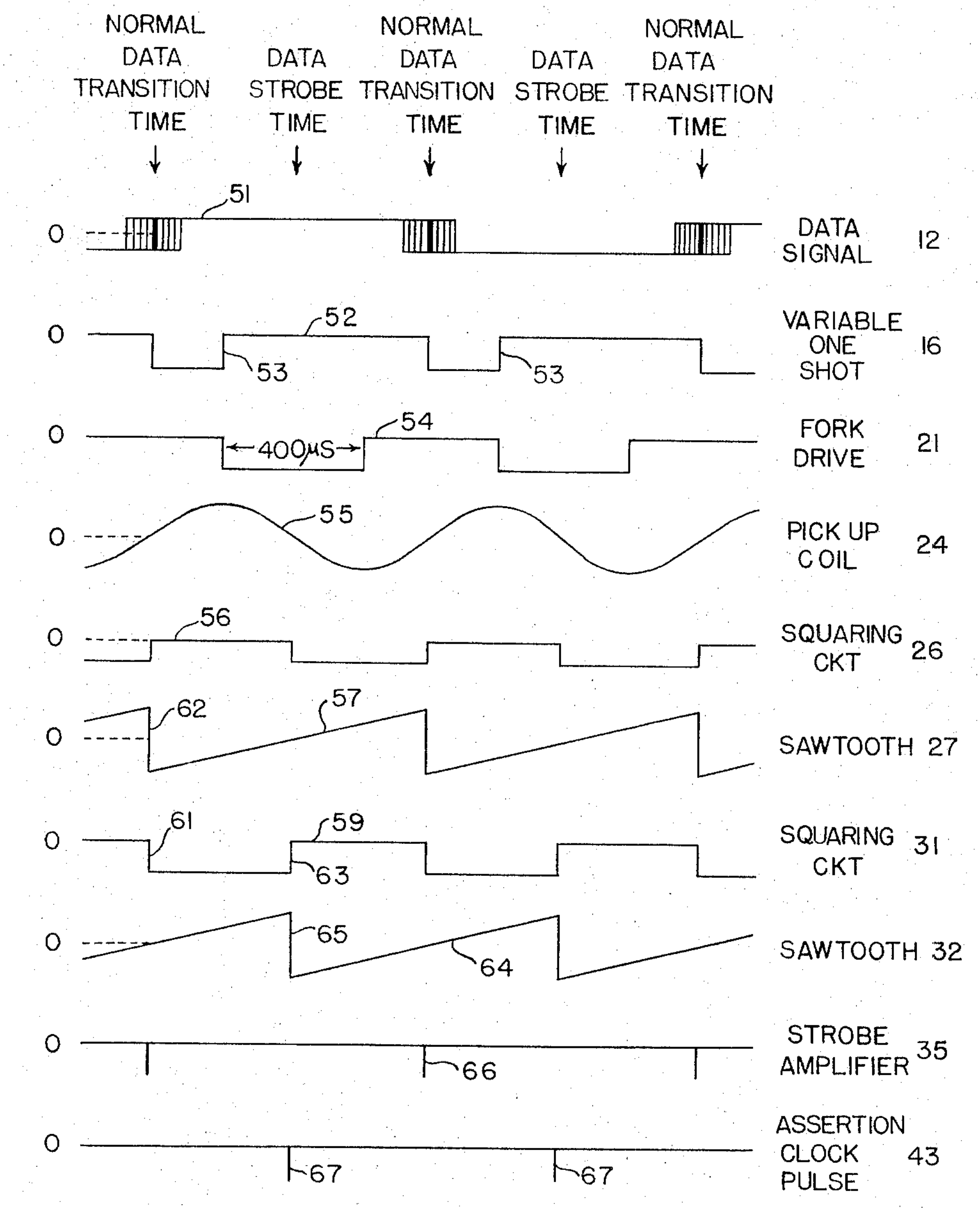

The foregoing objects are accomplished in the present preferred embodiment of the invention as shown in the accompanying drawings wherein:

FIG. 1 is a block diagram of equipment in a receiving station for generating the clock-pulse output; and FIG. 2 is a timing waveform diagram useful in understanding the invention.

Referring now to FIG. 1, the equipment for a receiving station is shown to comprise an input data buffer 11 which receives on input line 12 binary signals from the communication link. Under ordinary circumstances, the communication link supplies signals to line 12 which are representative of the binary states, ZERO and ONE, in accordance with a voltage level of predetermined value for each state. The actual voltage level employed whether bi-polar or uni-polar or whether going from positive to negative or vice versa for a given transition will depend upon the details of the circuits employed and is not critical to the understanding of the present invention. The data passes through an output buffer 13 which supplies on lead 14 the equipment which is to utilize the data, including the gating arrangement by which the data is clocked by the output pulse generated by the apparatus of the present invention. The actual utilization of the data and the clocking of the data by the clock pulse generator by this equipment is conventional and will not be further described.

The output of the input buffer 11 is applied to a one-shot 15 which in turn drives a variable one-shot 16, the output pulse duration of which can be varied within limits by means of a control 17. The output of the variable one-shot 16 is applied to an inverter 18 which develops a trigger output for the trailing edge of the one-shot pulse from the unit 16, thereby applying a trigger pulse to a fork drive one-shot 19 which is adjustably phased relative to data transitions by virtue of the length of the variable one-shot pulse achieved by means of control 17. The output of the fork drive one-shot 19 is applied to a fork drive amplifier 21 which is arranged to drive a tuning fork 22 by means of drive coil 23. The tuning fork 22 is preferably of relatively low-Q such as 1000 and has a pick-up coil 24 which, when the fork 22 is oscillating, has generated therein a sine wave that is generally in phase quadrature with the square wave driving signal applied to the drive coil 23. This sine wave signal from pick-up coil 24 is amplified in amplifier 25 and converted into a square wave of the same phase as the sine wave in a squaring and clipping circuit 26.

The square wave from circuit 26 is employed to generate a saw-tooth wave in saw-tooth generator 27. The saw-tooth generated by generator 27 is a wave symmetrically disposed about the zero voltage axis and is applied to a voltage comparator 28 which has a voltage comparison input lead 29. The operation of the voltage comparator 28 is to produce a switching waveform with the time at which switching occurs on the voltage run-down of the saw-tooth from generator 27 being determined by the voltage level input on lead 29. This switching waveform is squared in the squaring circuit 31, the square wave output of which is converted in to a saw-tooth wave by a second saw-tooth generator 32, which has a voltage run-down from negative to positive that is applied to a phase comparator 33.

The second input to phase comparator 33 is derived from one-shot trigger 15, the output of which drives a strobe one-shot 34 and strobe amplifier 35 to apply bipolar strobe pulses on lead 36 to the phase comparator 33. The operation of the phase comparator 33 produces a positive current output pulse if a data transition occurs later than its normal data transition time and a negative current output pulse if a data transition occurs earlier than a normal data transition time. These output pulses are amplitude analogs of the amount of time discrepancy between the data transition and its normal data transition time and of proper polarity as just described to provide correction error signals on lead 37 to an integrator 38, such that the voltage output of the integrator 38 on lead 29 is shifted in the proper direction to bring the saw-tooth generated by generator 32 into position where the phase comparison of the data transition signal on lead 36 and the saw-tooth applied to phase comparator 33 from the saw-tooth generator 32 produces a zero or no net change output signal on lead 37 of the comparator 33. Thus, by means of the phase comparator 33 and the integrator 38 an averaged correction is applied to the generation of the switching output of the voltage comparator 28 which maintains it midway between the data transitions within the averaging interval of integrator 38.

The switching output of the voltage comparator 28 is applied to a clamped squaring circuit 41 and a two microsecond delay circuit 42, the output of which is inverted twice in strobe inverters 42 and 44 to produce the desired clock-pulse signal appearing on lead 43. The inverse of this signal is obtained from the inverter 44 to provide a negation signal on lead 45 of the assertion clock pulse appearing on lead 43. These pulses may be applied to clock the data on lead 14 from the data output buffer 13 in any desired manner and for other purposes associated with the receipt of the binary signals as is well known in the art.

In order to maintain the equipment in readiness for the receipt of initial binary signals, the saw-tooth generators 27 and 32 when no input signal is applied are clamped to the positive voltage end of their operating range which may be 8.3 volts. A positive voltage level detector 46 is coupled to the output of saw-tooth 27 to stabilize other portions of the circuit as follows. Upon the detection of 8.3 volts at the saw-tooth generator 27, the detector 46 actuates a ground clamp circuit 47 which clamps the comparison voltage of voltage comparator 28 at the ground level, thereby establishing the norm for this comparator when signal processing begins. Similarly, the phase comparator 33 is maintained inactive by eliminating the strobe pulse inputs on lead 36. This can conveniently be done by means of a voltage clamp circuit 48 which disables the strobe amplifier 35 so that strobe pulses do not appear on the lead 36 as long as the clamp 48 is conditioned by the voltage level at the output of saw-tooth generator 27.

To avoid the condition of having the tuning fork 22 energized by feed-through signals when the local station is transmitting a reply message, a signal designated SEND NEGATION INPUT is applied to the fork drive 21 and the strobe inverter 44. This signal is derived from the sending equipment during message transmission and operates to block the passage of any signals to drive the fork 22 and to prevent the generation of the strobe pulse outputs on lines 43 and 45. Thus the equipment is in equilibrium condition at the start of reception of each message.

The equipment is brought into operative synchronizing condition at the beginning of each separate message by a transmission which precedes each message consisting of eight code characters where each character has the information pattern 0011110. In accordance with the preferred form of the invention, this character is transmitted as a dual bit transmission, so that the actual binary sequence is 01011010101001. Before this first code character has been fully received, the tuning fork 22 has built up sufficient mechanical energy storage to yield an output voltage large enough to cause the first saw-tooth wave to appear at the output of the generator 27. When this occurs, the voltage detector 46 removes the ground clamp condition provided by clamp 47 as well as the clamping condition provided by the voltage clamp 48, thereby permitting voltage comparison to begin in the comparator 28 and passing strobe pulses through the amplifier 35 to operate the phase comparator 33. The remaining code characters preliminary to the message transmission assure that synchronization is achieved by accurately correcting for frequency and phase discrepancies involved in the transmisseion and reception over a communication path and the respective terminal equipments. Thus the information content of the message is decoded with maximum reliability.

Referring now to FIG. 2, the waveform diagrams for certain portions of the circuit of FIG. 1 and will be described. The binary data signal on line 12 is represented as waveform 51, with the transitions being indicated as subject to jitter up to as much as $\pm 40$ percent error from the normal transition time shown. The transitions are processed to produce from the variable one-shot 16 the waveform 52 with the width of the one-shot 16 being adjusted so that the positive going transitions 53 occur at approximately 90° phase delay with respect to the time of the data transition. The positive going transitions 53 are applied to trigger the fork drive one-shot 19 which has a one-shot pulse length approximately equal to one half the normal bit interval between adjacent normal data transition times. Thus the fork drive 21 output is a waveform 54 which is triggered in synchronism with the transitions 53 and with the pulse ending approximately 400 micro-seconds later for an assumed data bit rate of 1200 bits per second. The square wave 54 is converted into a sine wave 55 upon passage through the tuning fork 22, the phase of the sine wave 55 being variable with respect to the drive output wave 54 in accordance with the frequency-phase characteristic of the tuning fork 22 and the frequency of the incoming signal.

The sine wave 55 is converted into a square wave 56 which is employed to generate a saw-tooth wave 57 which has a run-down from minus to plus voltage end points which occupies the full period of the square wave 56. The switching output of the voltage comparator 28 produces a square wave 59 which has negative going transitions 61 synchronized with the relaxation time 62 of the saw-tooth 57 and positive going transitions 63 at the voltage comparison point for the saw-tooth 57, which in FIG. 2 is shown to occur as the saw-tooth 57 crosses the ground or zero voltage level. For making phase adjustments, the integrator input on lead 29 to the voltage comparator 28 would alter the switching point of the comparator 28 from ground level and the transition 63 would not occur at the point corresponding to where the saw-tooth 57 crosses the zero voltage axis but would rather occur at the point representing the integrator input voltage on lead 29. In this manner the phase adjustment is accomplished.

The square wave 59 is applied to generate the output of saw-tooth generator 32 which is represented as waveform 64. The saw-tooth 64 relaxes in synchronism with the positive going transitions 63 of wave 59, as indicated at 65. The run down of saw-tooth 64 is from negative to positive, and the phase comparator 33 is responsive to the data transition strobes on lead 36, which are indicated as pulses 66, to produce the error signal for the integrator 38 in accordance with the frequency-phase characteristic of the tuning fork 22 as previously described. As indicated in FIG. 2 the strobe pulses 66 occur at the zero axis crossing of the saw-tooth 64 and hence no net error signal is generated for this condition. For any frequency error, the strobe pulse 66 would be displaced with respect to the zero crossing point of the saw-tooth 64 and a positive or negative error signal to the integrator 38 would result in a continuous phase correction which is equivalent to a frequency correction.

The desired data clocking strobe pulse is derived from the relaxation 65 of the saw-tooth 64 and is indicated in FIG. 2 as waveform 67.

While a specific embodiment of the invention has been disclosed and described, it will be apparent that many modifications of the particular arrangement for obtaining both phase and frequency correction without the employment of a local oscillator can be achieved without departing from the spirit and scope of the invention. Accordingly, the invention is to be limited only by the scope of the appended claims.

I claim:

1. A communication synchronizer for received binary signals having a bit interval determined by a nominal transition frequency comprising means for producing drive pulses of predetermined phase from each binary transition of said signals, an electromechanical resonator driven by said drive pulses, said resonator being tuned to said nominal transition frequency of said binary signals, means for deriving an output signal induced by the vibrations of said resonator, means for obtaining a comparison waveform from said output signal, means for selecting an intermediate point on said comparison waveform and producing a clock pulse in fixed time relation to said immediate point, and means responsive to the position of said intermediate point and said data transitions for adjusting the position of said intermediate point to be midway beway between said transitions.

2. A synchronizer according to claim 1 in which said resonator is a low-Q tuning fork.

3. A communication synchronizer for received binary signals having a bit interval determined by a nominal transition frequency comprising means for producing drive pulses of predetermined phase from each binary transition of said signals, an electromechanical resonator driven by said drive pulses, said resonator being tuned to said nominal transition frequency of said binary signals, means for deriving an output signal induced by the vibrations of said resonator, means for generating a saw-tooth waveform from said output, means for producing from said output a locally generated wave of adjustable phase relative to said output, a phase comparator responsive to the relative phase of said locally generated wave and said binary transitions to produce an error signal representing the magnitude and sense of the phase of said locally generated wave relative to said binary transitions, means responsive to said error signal for producing a voltage level representing the averaged phase error of said locally generated wave, and means for comparing said saw-tooth waveform with said voltage level to change the phase of said locally generated wave corresponding to the frequency difference between the transition frequency of said binary signals and the resonant frequency of said resonator.

4. A synchronizer according to claim 1 in which said resonator is a low-Q tuning fork.

5. The method of generating a clock pulse centered between transition times of a binary data signal having a bit interval between said transition times determined by a nominal transition frequency, said binary data signal being subject to substantial jitter and small percentage frequency deviation from said norminal transition frequency comprising the steps of generating a clock pulse during each bit interval, phase comparing said transition times and the generated clock pulse to provide average phase control of said clock pulse midway between successive transition times, and transferring a signal derived from said binary data signal through a resonator tuned to said nominal transition frequency to adjust the phase of said clock pulse in accordance with the frequency-phase transfer characteristic of said resonator.

References Cited

UNITED STATES PATENTS 2,957,045 10/1960 Perry ............. 178—69.5

JOHN W. CALDWELL, *Primary Examiner.*

ROBERT L. RICHARDSON, *Examiner.*